Dec. 26, 1944. W. J. FASO 2,365,810
CHUCK
Filed April 5, 1944 2 Sheets-Sheet 1
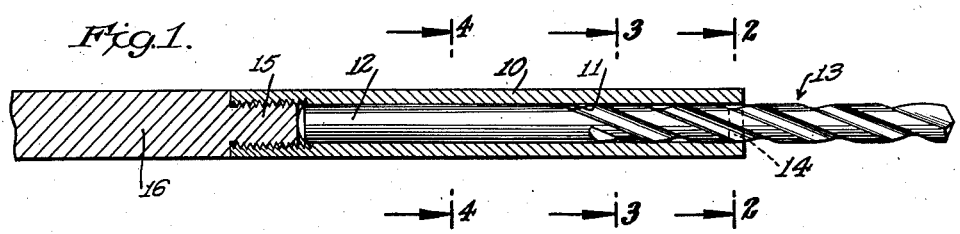
Fig.1.
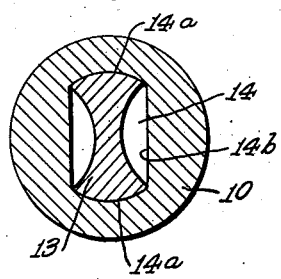 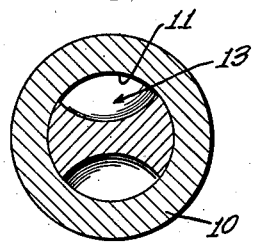 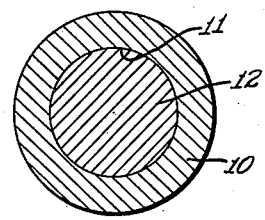
Fig.2. Fig.3. Fig.4.
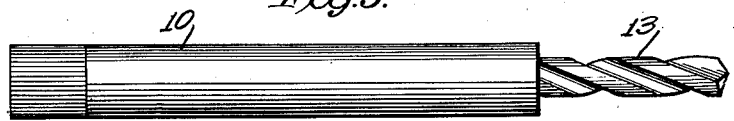
Fig.5.
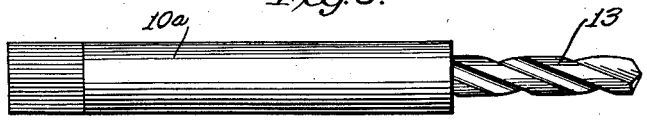
Fig.6.
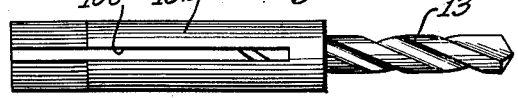
Fig.7.
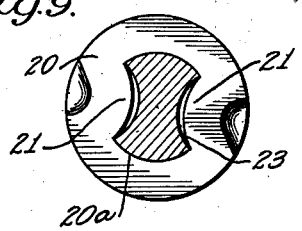 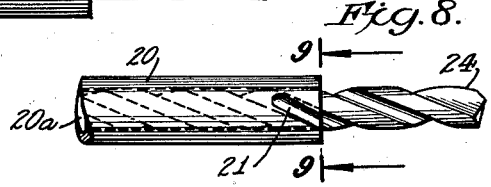
Fig.9. Fig.8.
INVENTOR.
WILLIAM J. FASO
BY
his ATTORNEYS

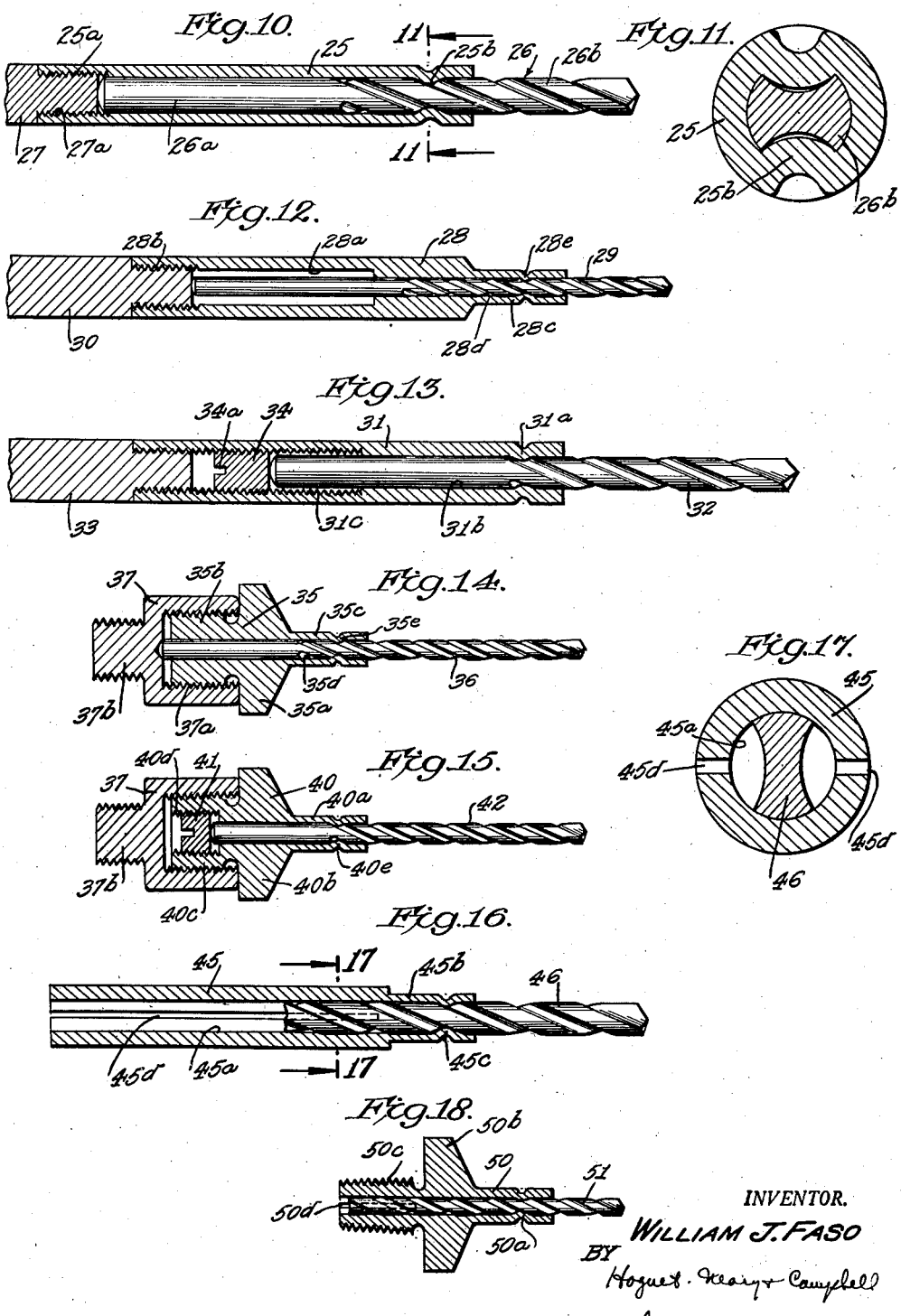

Patented Dec. 26, 1944

2,365,810

UNITED STATES PATENT OFFICE 2,365,810

CHUCK

William J. Faso, Bayside, N. Y.

Application April 5, 1944, Serial No. 529,591

4 Claims. (Cl. 279—9)

This invention relates to an improvement in chucks for receiving drills, reamers and the like and relates particularly to a novel form of chuck to be attached to a drilling device or used in conjunction with an extension rod for drilling holes in relatively inaccessible elements.

This is a continuation-in-part of my application Serial No. 501,241, filed September 4, 1943.

In the aircraft industry, and in many other industries, it is common to use an extension rod of considerable length for supporting a drill in order to drill holes in the interiors of wings, fuselages and the like.

The drills are usually secured to the extension rod by boring a hole in the end of the rod and then brazing the shank of the drill in the hole. The opposite end of the rod is then received in the drill chuck so that the extension rod with the drill thereon forms in effect a long drill element.

It is inherent that such extension rods have a certain amount of whip or a tendency to bend, with the result that the drills, especially the small drills commonly used, are subjected to bending stresses and are readily broken. The great number of drills that are broken and the difficulty of and the time consumed in attaching the drills to the extension rods has been a problem of major importance in the aircraft industry and in many other industries.

It would be highly desirable if some form of chuck were available which would permit a drill to be attached to the extension rod and the drill readily replaced if and when it is broken. Moreover, it would be highly desirable to provide extension drill chucks which would act to reinforce the drills and thereby minimize breakage thereof and which at the same time would permit the reuse of the broken drills after they have been resharpened.

An object of the present invention, accordingly, is to provide drill chucks of simple and compact form which permit a drill to be attached to and detached from an extension rod easily and in a minimum amount of time.

Another object of the invention is to provide a drill chuck capable of use directly in the chuck of a drilling machine or on an extension rod and which acts to reinforce a portion of the drill while exposing only the portion of the drill bit that is required in the drilling operation; thereby protecting and strengthening the drill.

Another object of the invention is to provide a related series of chucks of the type embodying the invention which are graduated in length so that when a drill is broken, while in use in a longer chuck of the series, it may be reground and inserted in a shorter chuck to thereby expose a sufficient length of the drill to permit drilling operations to be carried out with the reground drill.

Another object of the invention is to provide a related series of chucks that are capable of receiving and holding drills of different sizes, said chucks being interchangeable on an extension rod or in a drilling device.

Other types of drilling devices that are commonly used in many industries are the angle drill and the snake drill. Such drills include a chuck that is either arranged at an angle to the axis of the shaft that drives the chuck or is mounted on a flexible shaft permitting the drill bit to be introduced into small spaces. The chucks commonly used with these drills usually include an inner slotted sleeve that is compressed by an external camming sleeve to grip the shank of the drill. These elements are usually small and are easily lost. Moreover, it is a time-consuming operation to change the drill receiving sleeve each time a drill of a different size is used with the angle drill.

Another disadvantage of these prior angle drills is that the chucks are not standardized and the chucks for these devices cannot be interchanged. Therefore, in industries wherein angle drills made by different manufacturers are used, considerable confusion occurs when parts of the chucks are reordered or replaced.

Another object of the present invention, therefore, is to provide simplified forms of chucks for such angle drills.

A further object of the invention is to provide chucks that are usable with substantially all types of angle drills that are manufactured at the present time.

Other objects of the invention will become apparent from the following description of typical forms of chucks embodying the present invention.

In general, chucks of the type embodying the present invention may consist of a tubular member having a bore or passageway of the proper size to receive a conventional twist drill so that the shank and a portion of the twist drill may be inserted within the tubular member in sufficiently closely fitting relationship to prevent wobbling of the drill. Adjacent to one end of the tubular member, and preferably the outer end, the bore is of non-circular cross-section and of a shape which fits around the spiral cutting portions or within the flutes of the drill so that rotation of the drill, without axial movement relatively to the chuck, is prevented, and the drill is driven through the interfitting engagement of the non-circular wall portions of the bore with the flutes of the drill.

When a chuck of the type generally described above is used in conjunction with an extension rod, the inner end of the chuck may be provided with threads for engaging a threaded portion on the end of the extension rod or a threaded portion of an adapter interposed between the chuck and the extension rod. When extension rods of the conventional solid type are used, the inner end of the chuck is preferably threaded internally for receiving a threaded stud on the end of the extension rod. Consequently, during a drilling operation the drill will engage the end of the stud which furnishes endwise support and also serves, in cooperation with the non-circular bore portion of the chuck, to prevent relative rotation of the chuck and drill.

Devices of the type embodying the present invention have the advantage of permitting ready interchanging of drills of the same size on extension rods.

A series of chucks having threads fitting an extension rod may be provided with different size bores, so that a series of drills may be used with a single extension rod.

Similar chucks may be provided for use with angle drills and adapters provided therefor that permit the use of the chucks with any of the angle drills now manufactured.

Chucks embodying the present invention may be used in a jaw chuck of a conventional drilling apparatus as well as on an extension rod or in an angle device. A set of these chucks of different lengths, but the same diameter will permit the repeated use of broken drills, thereby greatly increasing the operating lives of the drills and permitting decided savings in the replacement cost of the drills.

For a better understanding of the present invention, reference may be had to the accompanying drawings, in which:

Figure 1 is a view in longitudinal section of a typical form of chuck embodying the present invention, illustrated as applied to an extension rod and containing a conventional twist drill;

Figure 2 is a view in section taken on line 2—2 of Figure 1;

Figure 3 is a view in section taken on line 3—3 of Figure 1;

Figure 4 is a view in section taken on line 4—4 of Figure 1;

Figures 5, 6 and 7 are side views of a series of chucks of the type embodying the present invention, illustrating different sizes of chucks and showing their use with drills which have been broken and reground;

Figure 8 is a view in side elevation and partly broken away showing a modified form of chuck;

Figure 9 is a view in section taken on line 9—9 of Figure 8;

Figure 10 is a view in section of a modified form of extension chuck;

Figure 11 is a view in cross-section taken on line 11—11 of Figure 10;

Figure 12 is a view in section of a modified form of chuck illustrating the use of such a chuck with a smaller drill;

Figure 13 is a view in section of another form of chuck embodying the invention, including a plug element for positioning the drill against axial movement;

Figure 14 is a view in section of a modified form of chuck and adapter for an angle drill;

Figure 15 is a view in section of a chuck and adapter for an angle drill including a plug for positioning the drill bit against axial movement;

Figure 16 is a view in section of another form of chuck embodying the present invention;

Figure 17 is a view in section taken on line 17—17 of Figure 16; and

Figure 18 is a view in section of a modified form of chuck for an angle drill.

As illustrated in Figures 1, 2, 3 and 4 of the drawings, a typical form of chuck embodying the invention may consist of a tubular member 10 having a circular bore 11 therein extending a portion of the length of the member 10 and of substantially the same diameter as the shank 12 of a twist drill 13. It will be understood that the member 10 may be of any desired internal diameter to receive drills of a desired size and that the bore 11 need not be of circular cross-section so long as it receives the drill 13 closely and without wobbling. As shown particularly in Figure 4, the bore 11 receives the shank 12 of the drill 13 very closely, but with a sliding fit so that the drill can be inserted from the left hand end of the member 10 and received therein. As illustrated in Figure 3, the bore 11 is circular up to within a short distance of the right hand end of the chuck 10 so that it engages and reinforces the twist portion of the drill.

Referring now to Figure 2, the right hand end of the chuck 10 contains a non-circular aperture 14 therein having curved ends 14a closely fitting against the blades of the drill and relatively flat sides 14b which are spaced apart a sufficient distance to engage the edges of the cutting blades of the drill 13. This arrangement permits the drill to be received through the opening 14, but prevents the drill from passing entirely through the member 10 for the reason that the opening 14 is smaller than the shank 12 of the drill.

In order to secure the member 10 to an extension rod, it may be threaded internally for receiving a threaded stud 15 on an extension rod 16. The threaded stud 15 forms an abutment for preventing endwise movement of the drill to the left. It will be understood, of course, that the threads in the tube 10 and on the extension rod 16 are so formed as to cause the tube 10 and the rod 16 to be screwed together during a drilling operation and that the positions of the threads on the rod 16 and the member 10 may be reversed.

With a chuck of the type described above, a drill may be readily inserted within the tube 10 and the tube then attached to the end of the extension rod 16. If the drill is broken during use, the member 10 may be unscrewed from the extension rod 16, a new drill of the same size inserted in the member 10 and the latter again attached to the extension rod 16. Moreover, if the twist portion is broken off where it joins the shank, the twist portion, alone, may be used in the member 10.

In order to permit the reuse of drills that are broken, a series of chuck members 10, 10a and 10b of different lengths, but having the same internal diameter, may be provided, as shown in Figures 5, 6 and 7. Thus, the member 10 may be of such length that only a relatively small amount of the drill 13 is exposed. The remainder of the drill is reinforced and rigidified by the member 10 and the chuck may act as a depth gauge. Should the exposed portion of the drill 13 be broken, it can be removed from the member 10, reground and then used in a shorter chuck member 10a. Similarly, if the exposed end of the drill is again broken off, the drill can be reground and used in conjunction with a still shorter chuck member 10b, as shown in Figure 7. Thus, by providing a related series of chucks, broken drills may be used a number of times. Inasmuch as the chucks are not broken as easily as the drills, it will be apparent that one set of chucks will outlast a large number of drills.

As shown in the drawings, the left hand ends of the chucks may be knurled to facilitate their attachment to or release from an extension rod.

The chuck disclosed in Figure 7, and in fact any of the chucks described above, may be used with a conventional jaw type of chuck in a drilling apparatus. Preferably, when my chuck is used in conjunction with a conventional jaw type of chuck, it is provided with one or more longitudinally extending slots 10c which permit the chuck to be pressed against the drill shank and thereby grip and retain it against endwise movement.

A modified type of chuck is illustrated in Figures 8 and 9. Because of the difficulties at the present time of obtaining machinery for broaching the non-circular hole 14 in the end of the chuck 10, it may be found desirable to form the hole in a different way. The chuck may be formed of an elongated tube 20 having a circular bore 20a completely therethrough. Before the tube 20 is hardened, one end portion of the tube 20 may be punched to form protuberances 21 projecting into the bore from opposite sides thereof, thereby forming a generally figure-8 shaped opening 23 which closely receives the drill 24. Inasmuch as the grooves in the drill 24 are spirally disposed, the protuberances 21 are inclined at an angle to the axis of the tube 20, substantially parallel to the inclination of the spiral grooves or flutes of the drill so that the drill can be inserted and removed without jamming. It will be understood that only one protuberance 21 need be provided but better balance at high speeds is obtained with two. After the end of the tube 20 has been given the desired shape, the entire tube 20 may be subjected to a hardening treatment.

The form of extension chuck illustrated in Figures 10 and 11 is similar to those forms described above in that it includes a tubular member 25 which is initially of cylindrical, annular form. The internal diameter of the tubular member 25 may be such as to fit closely around the shank 26a and the fluted portion 26b of the drill 26. One end of the member 25 is provided with an internally threaded portion 25a for receiving the threaded end portion 27a of an extension rod 27. The opposite end of the tubular member 25 is provided with inwardly extending projections 25b that are formed by punching in the sidewalls of the tube so that the projections or dimples fit closely within the flutes of the drill 26. The formation of the projections 25b in the manner described above greatly simplifies the manufacture of the chucks, inasmuch as expensive and complicated machining operations are not required for the production of such chucks.

The form of chuck shown in Figure 12 illustrates the manner in which a series of chucks can be produced for receiving drills of different sizes and at the same time being usable with a common extension rod for the series. This form of chuck includes a tubular member 28 having a centrally disposed bore 28a therein of larger diameter than the drill 29. This larger bore 28a is provided with threads 28b at one end for receiving the threaded end of the extension rod 30. The opposite end 28c of the tubular member 28 is reduced in external diameter and is provided with a bore 28d of such diameter as to fit closely about the shank and fluted portions of the drill 29. The diameter of the bore 28d may be varied to fit various sizes of drills. Thus, the bore 28d may be of smaller diameter than illustrated, or it may be as large as the diameter of the bore 28a.

The reduced end portion 28c of the chuck may also be provided with punched-in projections 28e which engage in the flutes of the drill 29.

An advantage of the type of chuck disclosed in Figure 12 is that by reducing the diameter of the forward end of the chuck 28, better visibility of the work is obtained and less difficulty is encountered in centering the drill 29 in the desired position on the work.

The above-described forms of chucks usually permit a certain amount of axial movement of the drill in the chuck inasmuch as the length of the shank portion of the drill usually will be less than the spacing between the extension rod and the projections in the chuck. If such endplay or backlash is undesirable, it can be overcome by the form of chuck disclosed in Figure 13. This chuck includes a tubular member 31 having the projections 31a punched-in its forward end and a bore portion 31b for receiving the shank and fluted portion of the drill 32 closely. The left hand end of the member 31 is provided with internal threads 31c extending about one-half the length of the member 31 and of an inside diameter at least equal to the diameter of the bore 31b. The threaded portion 31c is adapted to receive the threaded portion of the extension rod 33 and also a threaded adjusting plug 34 which is provided with a kerf 34a by means of which it may be adjusted axially of the member 31 into engagement with the end of the drill 32. When the plug 34 is adjusted so as to push the drill into a position that the projections 31a engage in the inner ends of the flutes of the drill 32, the drill is positioned against axial movement in either direction.

As shown in Figures 14 and 15, chucks of the type embodying the present invention are particularly well adapted for use with angle drills which have the chuck thereof disposed at an angle to the axis of the motor or driveshaft so that the drills can be used in relatively inaccessible places. Usually such drills include interchangeable split collets which are clamped about a drill by means of a camming sleeve that is threaded into a portion of the chuck. The elements of such chucks normally being small, they are easily lost. Moreover, they are difficult to change when different sizes of drills are to be used in the angle drilling device.

A suitable form of chuck embodying the present invention for use in such angle drills is disclosed in Figure 14. This chuck includes a tubular member 35 having a nut portion 35a thereon, an enlarged externally threaded end portion 35b thereon and a reduced tubular portion 35c. As illustrated, the member includes a central bore 35d of substantially uniform diameter throughout that receives the shank and a part of the fluted portion of the drill. The reduced portion 35c is provided with inwardly punched projections 35e which engage within the flutes of the drill 36.

The opposite threaded end portion 35b is provided with a thread that will fit one form of angle drill so that chucks of this type can be readily attached to and detached from the angle drill. It will be understood that a chuck of the type disclosed in Figure 14 may be provided with bores 35d of any desired diameter and a series of such chucks may be provided for receiving drills of different diameters for replacement in the angle drilling device.

Inasmuch as the angle drill devices made by various manufacturers have sockets for receiving the threaded portion 35b that are of different diameters and include different pitch threads, a chuck of the type described above cannot be used universally. However, the chuck may be provided with an adapter 37 having an internally threaded portion 37a adapted to fit the threaded portion 35b of the chuck and another threaded external portion 37b which is provided with threads that will fit another form of angle drilling device. By providing a plurality of such adapters 37 for each set of chucks 35, it is possible to use my chucks in any of the angle drilling devices manufactured at the present time. A survey of the industry indicates that three forms of adapters are sufficient to permit the use of my chucks with all of the angle drilling devices produced at the present time.

Similar adapters can be provided for completely replacing the adjustable jaw chucks commonly used on ordinary drilling devices.

The drill 36 in many instances has a shank of such length that it will be positioned with relatively little capacity for axial movement in the chuck when the chuck is inserted in an angle drilling device or is used with an adapter such as the adapter 37. However, in some instances it may be found that there is a certain amount of backlash in the drill. This backlash can be overcome by the use of a chuck for an angle drill such as that disclosed in Figure 15. This form of chuck includes a tubular member 40 similar to that disclosed in Figure 14 including the reduced tubular portion 40a for receiving the drill, the nut member 40b and an elongated internally and externally threaded shank portion 40c. The external threads on the portion 40c are adapted to be received in the adapter 37 or in the socket of an angle drill. The internal threads 40d of the extension 40c are adapted to receive an externally threaded adjusting plug 41 for engagement with the inner end of the drill 42 to urge it into a position such that the punched-in projections 40e engage in the inner ends of the flutes of the drill 42.

This form of chuck can also be modified to receive various sizes of drills by increasing the diameter of the sleeve portion 40a or decreasing it, as the purpose demands. Thus, the sleeve portion 40a may have a bore therein smaller than illustrated in Figure 15 or as large a diameter as the internal diameter of the threads 40d so that the drill can be inserted from the rear end of the chuck 40. While a threaded connection between the chuck and the adapter or other drill fitting is preferred, it will be understood that other forms of connections may be used such as a pin and non-circular socket or a bayonet slot fitting.

The chuck illustrated in Figures 16 and 17 is particularly useful for reinforcing drills or for permitting the use of broken drills in an ordinary drilling device having a conventional type of jaw chuck. This device includes a tubular member 45 having a central bore 45a therein of substantially the shape and diameter of a drill 46 to be received therein. One end 45b of the chuck may be reduced in external diameter, but is continuous in order to afford adequate support for the drill. This reduced end portion 45b is provided with inwardly punched projections 45c for engagement in the flutes of the drill 46. The opposite enlarged portion of the tubular member 45 may be provided with one or more slots 45d terminating short of the end portion 45b so that the portion containing the slots 45d may be compressed around the drill shank or a fluted portion of the drill to retain it in the chuck 45.

Chucks for use in angle drills may be slotted similarly to the form of chuck disclosed in Figures 16 and 17 in order to permit the use of broken drills therein. Such an angle chuck is illustrated in Figure 18. This chuck includes a tubular portion 50 for receiving a drill 51 closely and having the inwardly punched projections 50a for fitting in the flutes of the drill 51. The tubular member 50 is provided with a nut portion 50b for attaching the chuck to and detaching it from the threaded socket of an angle drill and is provided with a tapered threaded portion 50c adapted to be received in the threaded portion of the angle drill. The threaded portion 50c is provided with one or more slots 50d extending parallel to the axis of the threads so that the threaded portion can be compressed against the drill 51 to retain it against endwise movement.

From the preceding description of typical forms of devices embodying the present invention, it will be apparent that I have provided extremely simple, yet effective chucks for receiving and retaining conventional types of twist drills and that such chucks are capable of permitting the ready replacement of drills of the same or different size, the reuse of broken drills and of rigidifying and strengthening such drills while in use.

The chucks can be supplied in related sets, similar to socket wrench sets, permitting their use with substantially any type of hand or motor-actuated drill and greatly facilitating the interchange of the drills. Moreover, in many industries where a drilling device is used with only one size of drill, my chuck can be substituted readily for the adjustable chucks, commonly used, at a marked saving in cost.

It will be understood that chucks of the type embodying the present invention are susceptible to considerable modification in shape and size and that they are adaptable for uses other than those described above. Therefore, the forms of chucks illustrated herein should be considered as illustrative and not as limiting the scope of the following claims.

It will be further understood that the chuck may be used with various types of twist or spiral drills and that the shank portion may be of the same diameter as the twist portion or of a different diameter. In those cases where the shank of the drill is of an external diameter corresponding to that of a circle inscribing at least a substantial part of the depth of the flutes of the drill, it is insured that the inwardly extending driving projections carried by the outer annular, unbroken wall portion of the open-ended member will be brought into engagement with the shank portion at the ends of the flutes in case the drill-chuck assembly is disposed with the drill depending downwardly, thus preventing the drill from falling out of the chuck when it is to be connected and driven in any of the ways shown, for example, in Figs. 1, 10, 12, 13, 14 and 15.

Where, in the appended claims, reference is made to inwardly extending projections carried by the outer, annular unbroken wall portion of the open-ended member or chuck, it is to be understood that the term "projections" is to be construed as including a single projection or one or more equivalent protuberances or deformations of the wall surfaces, including the various examples illustrated in the drawings, that will establish driving connection with the flutes of the drill but which will serve to prevent the shank portion of the drill from passing the thus restricted portion of the bore.

I claim:

1. In a chuck for twist drills having a helically fluted portion and a cylindrical shank portion of an external diameter corresponding to that of a circle inscribing at least a substantial part of the depth of the flutes of said drill, an open-ended member having, adjacent one end thereof, an annular unbroken wall portion defining a bore adapted to establish a sliding fit with the peripheral surfaces of the flutes of a twist drill inserted therein and another wall portion defining a continuation of said bore extending toward the opposite end of said member, said bore continuation having a diameter at least as great as the maximum external diameter of said drill to permit the drill to be inserted from said opposite end, and said annular unbroken wall portion having projections extending inwardly into said first-mentioned bore for engagement with the flutes of said drill to transmit driving motion to said drill at the points of engagement of said projections with the flutes of the drill, and said projections further being of a size sufficient to engage with the shank portion of said drill to prevent the drill from falling out of the bore of said member when the assembly is disposed with the drill depending downwardly, and means associated with said open-ended member adjacent said opposite end thereof for limiting retrograde movement of said drill.

2. In a chuck for twist drills having a helically fluted portion, an open-ended member having, adjacent one end thereof, an annular unbroken wall portion defining a bore adapted to establish a sliding fit with the peripheral surfaces of the flutes of a twist drill inserted therein, and another wall portion defining a continuation of said bore extending toward the opposite end of said member, said bore continuation having a diameter at least as great as the maximum external diameter of said drill to permit the drill to be inserted from said opposite end, and said annular unbroken wall portion having projections extending inwardly into said first-mentioned bore for engagement with the flutes of said drill to transmit driving motion to said drill at the points of engagement of said projections with said flutes, and the open-ended member having a slot extending axially therealong from said opposite end toward but terminating short of said unbroken wall portion, said slot permitting compression of the slotted portion of said open-ended member to grip said drill and maintain it in fixed position lengthwise of said bore.

3. In a chuck for twist drills having a helically fluted portion and a shank portion of an external diameter corresponding to that of a circle inscribing at least a substantial part of the depth of the flutes of said drill, an open-ended member having, adjacent one end thereof, an annular unbroken wall portion defining a bore adapted to establish a sliding fit with the peripheral surfaces of the flutes of a twist drill inserted therein and having another wall portion defining a continuation of said bore extending toward the opposite end of said member, said bore continuation having a diameter at least as great as the maximum external diameter of said drill to permit the drill to be inserted from said opposite end, and said annular unbroken wall portion having projections extending inwardly into said first-mentioned bore for engagement with the flutes of said drill to transmit driving motion to said drill at the points of engagement of said projections with the flutes of said drill, and said projections further being of a size sufficient to engage with the shank portion of said drill to prevent the drill from falling out of said open-ended member when the assembly is disposed with the drill depending downwardly, and said member being threaded adjacent said opposite end thereof for engagement with means for limiting retrograde movement of said drill.

4. An extension chuck assembly for twist drills having a helically fluted portion and a shank portion of an external diameter corresponding to that of a circle inscribing at least a substantial part of the depth of the flutes of said drill, comprising an open-ended member having, adjacent one end thereof, an annular, unbroken wall portion defining a bore adapted to establish a sliding fit with the peripheral surfaces of the flutes of a twist drill inserted therein and having another wall portion defining a continuation of said bore extending toward the opposite end of said member, said bore continuation having a diameter at least as great as the maximum external diameter of said drill to permit the drill to be inserted from said opposite end, and said annular unbroken wall portion having projections extending inwardly into said first-mentioned bore for engagement with the flutes of said drill to transmit driving motion to said drill at the points of engagement of said projections with the flutes of the drill, and said projections further acting by engagement with the shank portion of said drill to prevent the drill from falling out of the bore of said open-ended member when the assembly is disposed with the drill depending downwardly, and means connected to said member at said opposite end thereof for providing an extension for connecting said member to rotatable driving means, said extension means carrying abutment means for limiting retrograde movement of said drill.

WILLIAM J. FASO.